F. G. BUTLER.
Hay-Tedder Fork.
No. 215,092. Patented May 6, 1879.
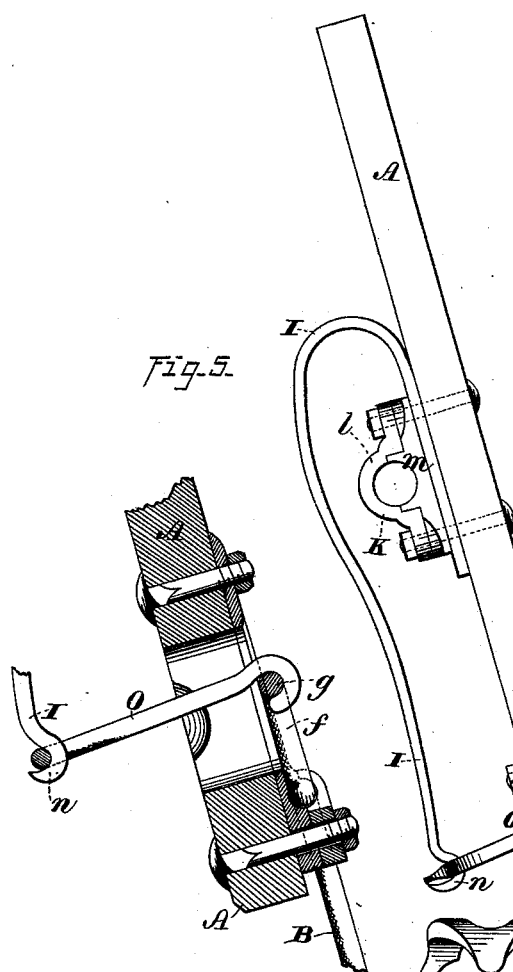
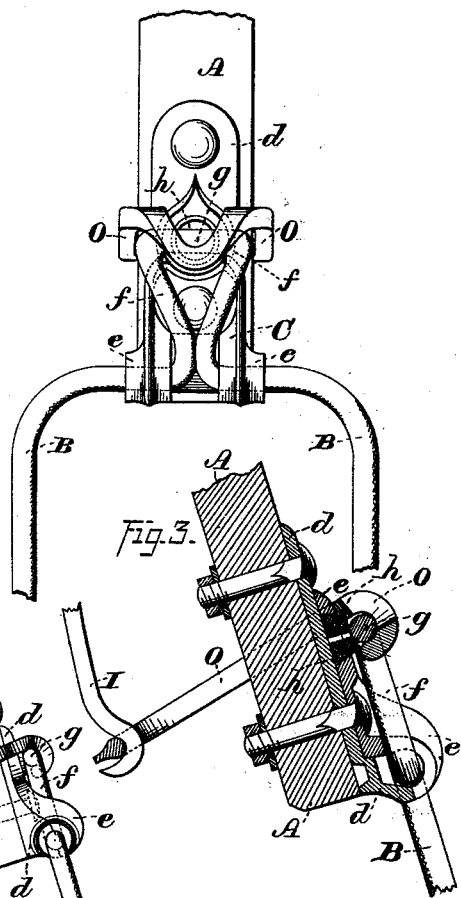
Witnesses:
Jas. E. Hutchinson.
Penn. H. Calsted.
Inventor:
Francis G. Butler,
by J. J. Halsted,
his Atty.

UNITED STATES PATENT OFFICE.

FRANCIS G. BUTLER, OF BELLOWS FALLS, VERMONT, ASSIGNOR TO VERMONT FARM MACHINE COMPANY, OF SAME PLACE.

IMPROVEMENT IN HAY-TEDDER FORKS.

Specification forming part of Letters Patent No. 215,092, dated May 6, 1879; application filed December 23, 1878.

*To all whom it may concern:*

Be it known that I, FRANCIS G. BUTLER, of Bellows Falls, in the county of Windham and State of Vermont, have invented certain new and useful Improvements in Hay-Tedder Forks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to the special manner and means of applying and securing the spring to the fork-supporting arm and to its connection with the fork; and it further relates to a special means for preventing the clicking or abrupt blow of metal upon metal when the fork flies back into position, all which will be sufficiently explained in the following description.

Figure 1 illustrates one of the arms of a hay-tedder with my improvements applied thereto; Figs. 2 and 3, respectively, front and sectional views; Fig. 4, a plan of the link, and Fig. 5 a modification.

A is the fork-supporting arm; B, the fork, having its journal-bearings in a box or housing, C, cast in two parts, $d$ $e$, both of which are bolted to each other and to the arm A in such manner as to permit the eye or lever-loop $f$ of the fork to have the required movement consequent upon the movements of the fork, and also to permit such eye at its bight or bend $g$ to rest upon a rubber pad or cushion, $h$, when the fork is not turned upon its bearings, and to strike upon such cushion when the fork springs suddenly back to place under the force of the spring hereinafter mentioned. This cushion is lodged securely in the upper part or half of the box C, as shown, or in any appropriate manner, so long as its position and its height above the part of the box to which it is applied be adapted to receive the impact of the fork-head, to avoid the jarring of the mechanism and the noises incident thereto, and the liability to breakage of the metallic parts.

Upon the under side of the arm A, and therefore as much as practicable out of the way of the hay, as well as out of the way of danger from accidents, I affix the spring I, which exerts its force upon the fork. This spring I bend and retrovert at its upper end, and secure it to the arm by the same bolts or fasteners which secure the box K for the main or crank shaft of the machine, and which shaft it is not necessary to describe, as its function of giving the throw to the tedder-arms is well understood.

The spring, it will be observed, is at one end lodged under the box or bearing K, and the latter is made in two parts, $l$ $m$, and the same bolts hold not only both these parts, but also the spring to the arm A. Thus no needless holes or bolts are required, and they are reduced to the minimum, and the primitive strength of the arm is therefore preserved to the fullest possible extent. The other extremity of the spring is bent outward into a hook form, as seen at $n$, to engage with a link, $o$, whose other end hooks upon the eye or head of the fork.

The link $o$ may either span the arm, as shown in Fig. 1, or it may pass through an opening in the arm, as shown in the modification in Fig. 5.

It will now be observed that in a hay-tedder furnished with forks applied as above stated, the spring is in the best location for the practical uses of the machine, little liable to damage, that all its force is utilized, and without liability to become clogged with hay; that, notwithstanding its power, the rubber cushion checks all noise and shock just where these are apt to be the greatest; that there is ample room for the play and movement of the spring, as its operative portion does not anywhere hug the arm closely, and it cannot, when released, fly against the arm, and thereby rattle, inasmuch as it must in such case fly away from the arm; that the fork may be readily inserted or removed, inasmuch as its bearing, being in two parts, is separable; that the bearings for the crank-shaft being also separable, and the under plate of such bearing lying flat upon the arm, no part of the arm is cut away or weakened to receive and lodge such shaft, and the latter has a durable metallic bearing all around its periphery, while the whole structure is exceedingly strong and very efficient for the purposes intended.

I claim—

1. The retroverted spring I, applied at one of its ends to the under side of the arm A, such end being interposed between the arm and the crank-shaft bearing, and both it and the bearing being secured to place by the same bolts.

2. In combination, the fork, a spring on the under side of the fork-supporting arm, and a link to connect these parts together, substantially as shown and described.

3. In combination with the fork and with its bearing plate or box, a rubber or elastic cushion, substantially as shown and described.

FRANCIS G. BUTLER.

Witnesses:
N. G. WILLIAMS,
A. J. HOLLEY.